United States Patent
Leis

(10) Patent No.: US 11,246,272 B2
(45) Date of Patent: Feb. 15, 2022

(54) TURF SWEEPER WITH MECHANICAL LOADING AND RECIRCULATING AIR STREAM

(71) Applicant: Harper Industries, Inc., Harper, KS (US)

(72) Inventor: Casey A. Leis, Cheney, KS (US)

(73) Assignee: Harper Industries, Inc., Harper, KS (US)

( * ) Notice: Subject to any disclaimer, the term of this patent is extended or adjusted under 35 U.S.C. 154(b) by 219 days.

(21) Appl. No.: 16/738,657

(22) Filed: Jan. 9, 2020

(65) Prior Publication Data

US 2020/0245570 A1 Aug. 6, 2020

Related U.S. Application Data

(60) Provisional application No. 62/801,434, filed on Feb. 5, 2019.

(51) Int. Cl.
*A01G 20/47* (2018.01)

(52) U.S. Cl.
CPC ................................... *A01G 20/47* (2018.02)

(58) Field of Classification Search
CPC ............................... A01G 20/43; A01G 20/47
See application file for complete search history.

(56) References Cited

U.S. PATENT DOCUMENTS

| | | | |
|---|---|---|---|
| 564,013 A | 7/1896 | Furnas | |
| 1,459,968 A | 6/1923 | Bailly | |
| 2,018,791 A | 10/1935 | Kern | |
| 3,007,191 A | 11/1961 | Braun | |
| 3,512,206 A | 5/1970 | Young | |
| 3,662,427 A | 5/1972 | Hanna | |
| 3,755,851 A | 9/1973 | Williams | |
| 3,977,039 A | 8/1976 | Block | |
| 4,006,511 A * | 2/1977 | Larsen | E01H 1/0845 15/422.2 |
| 4,044,422 A | 8/1977 | Larsen | |
| 4,099,290 A | 7/1978 | Hiszpanski | |

(Continued)

FOREIGN PATENT DOCUMENTS

| | | | |
|---|---|---|---|
| DE | 3713445 A1 * | 11/1988 | ............. A01G 20/43 |
| DE | 9011691 U1 * | 12/1991 | |

(Continued)

*Primary Examiner* — Marc Carlson
(74) *Attorney, Agent, or Firm* — Erickson Kernell IP, LLC; Kent R. Erickson

(57) ABSTRACT

A turf sweeper includes a hopper mounted on a frame. A debris loading duct mounted on the frame includes an intake opening supported in closely spaced relation above the ground and a discharge opening at a discharge end communicating with a hopper inlet. A broom is rotatably mounted within an intake section of the debris loading duct proximate and across the intake opening. A paddle rotor, having a plurality of paddles outwardly projecting paddles is rotatably mounted within and across a transfer section of the debris loading duct with a path of rotation of tips of the paddles extending in closely spaced relation to a path of rotation of tips of the pick-up members of the pick-up head. A return air duct flow connects a return air outlet to the hopper with a return air opening through the transfer section of the debris loading duct.

21 Claims, 10 Drawing Sheets

(56) References Cited

U.S. PATENT DOCUMENTS

| | | |
|---|---|---|
| 4,109,341 A | 8/1978 | Larsen et al. |
| 4,310,944 A | 1/1982 | Kroll et al. |
| 4,457,043 A | 7/1984 | Oeberg et al. |
| 4,466,156 A | 8/1984 | Blehert |
| 4,570,287 A | 2/1986 | Kerschner et al. |
| 4,660,248 A | 4/1987 | Young |
| 4,773,121 A | 9/1988 | Young |
| 4,885,817 A | 12/1989 | Tanase |
| 5,317,783 A | 6/1994 | Williamson |
| 5,457,848 A | 10/1995 | Miwa |
| 5,613,269 A | 3/1997 | Miwa |
| 5,778,648 A | 7/1998 | Parkes et al. |
| 5,848,521 A * | 12/1998 | Kobayashi ............ A01G 20/47 56/13.2 |
| 6,070,290 A * | 6/2000 | Schwarze ............. A01G 20/47 15/340.1 |
| 6,122,797 A * | 9/2000 | Vanderlinden ........ E01H 1/0872 15/340.1 |
| 6,161,250 A | 12/2000 | Young et al. |
| 6,263,540 B1 | 7/2001 | Vanderlinden |
| 7,191,485 B1 * | 3/2007 | Ramer ................. E01H 1/0872 15/34 |
| 9,832,935 B1 * | 12/2017 | Nitz ....................... A01G 20/43 |
| 2005/0194156 A1 * | 9/2005 | Job ...................... A01B 45/026 172/21 |
| 2006/0277714 A1 * | 12/2006 | Dunning ............... A47L 9/1608 15/405 |

FOREIGN PATENT DOCUMENTS

| | | |
|---|---|---|
| DE | 4025461 A1 * | 2/1992 |
| DE | 9420890 U1 * | 6/1995 |
| DE | 102006034435 A1 * | 1/2008 |
| DE | 102006034436 A1 * | 1/2008 |
| DE | 102016124896 A1 * | 6/2018 |
| EP | 0668402 A1 * | 8/1995 |
| JP | 09192433 A * | 7/1997 |

* cited by examiner

TURF SWEEPER WITH MECHANICAL LOADING AND RECIRCULATING AIR STREAM

CROSS-REFERENCE TO RELATED APPLICATIONS

This application claims the benefit of provisional patent application Ser. No. 62/801,434, filed Feb. 5, 2019, the contents of which are incorporated herein by reference.

BACKGROUND OF THE INVENTION

Field of the Invention

This invention relates to turf sweepers having a hopper for collecting debris swept from a lawn or turf surface in which the debris is directed mechanically and in a stream of air into a debris collection hopper and the stream of air is recirculated within the sweeper.

Description of the Related Art

Sweepers adapted to collect lawn debris are known in the art. U.S. Pat. No. 7,191,485 assigned to Harper Industries, Inc. discloses a vacuum sweeper for collecting debris on turf which includes an air recirculating system to reduce the amount of dust and particulate matter discharged into the atmosphere by the sweeper. A self-propelled embodiment of the sweeper disclosed in U.S. Pat. No. 7,191,485 is sold by Harper Industries, Inc. as the TV35 turf vacuum. Due to the power requirements of the blower, the TV35 turf vacuum, requires an engine rated at 44 to 50 horsepower. There remains a need for a turf sweeper having lower power requirements to reduce the cost of the sweeper. Such a turf sweeper would preferably be designed to operate effectively with an engine producing at a maximum 25 horsepower.

SUMMARY OF THE INVENTION

The present invention is directed to a turf sweeper including a paddle rotor which kinetically and pneumatically transfers debris from a rotary broom, through a debris loading duct and into an attached hopper. The pressurized air which assists in transferring debris into the hopper is discharged out of the hopper through return air outlets on the sides of the hopper. The pressurized air is directed through return air ducts extending along the sides of the debris loading duct. The return air ducts open into the debris loading duct adjacent axial ends of the paddle rotor, the rotation of which draws the return air back into the debris loading duct with paddles on the paddle rotor then moving and recirculating the air back through the debris loading duct and into the hopper.

DETAILED DESCRIPTION OF THE PREFERRED EMBODIMENTS

Figure 1:
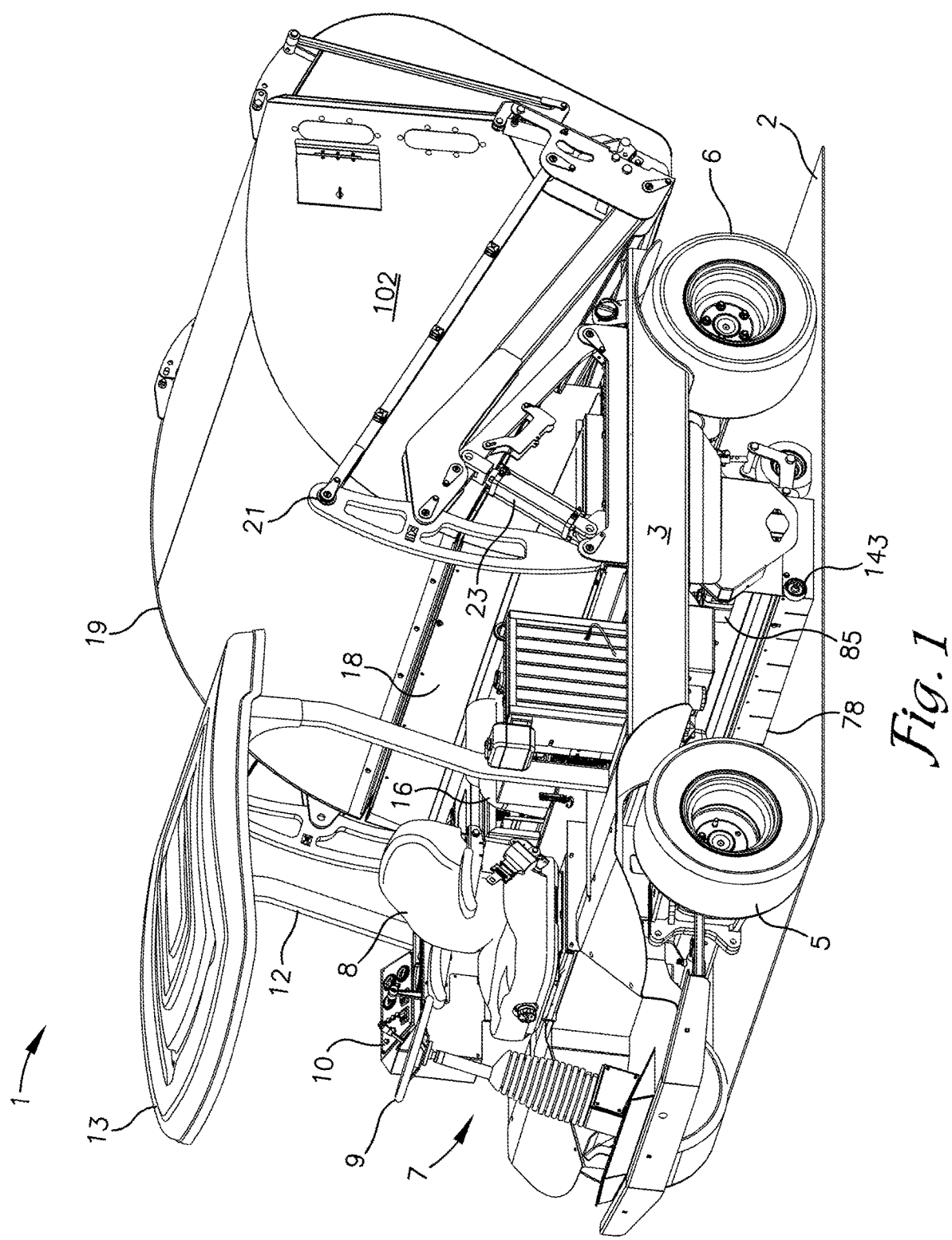
FIG. 1 is a perspective view of a self-propelled turf sweeper having a hopper and a debris loading assembly mounted on a frame supported on wheels above the ground over which it is propelled.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to FIG. 1, the reference numeral 1 refers to a turf sweeper, which in the embodiment shown is self-propelled. It is to be understood that the improvements disclosed herein could be incorporated into a towed turf sweeper. The sweeper 1 is designed for use in collecting debris such as leaves, lawn clippings, thatch and core aeration plugs from large turf type surfaces 2 as found at golf courses, parks, office parks, highway right of ways and the like.

The sweeper 1 includes a main frame or chassis 3 supported above the ground on front and rear wheels 5 and 6. An operator station 7 is mounted on the front of the frame 3 and includes a driver's seat 8, steering assembly 9 and sweeper controls 10. A roll bar 12 extends over the driver's seat 8 and may have a canopy 13 supported thereon. As used herein, references to the left side of the sweeper 1 are made with reference to the side of an operator sitting in the driver's seat 8 with the left side of the machine corresponding to the left side of the operator.

An engine 16 is mounted on the frame 3 behind the driver's seat 8 and in front of a debris loading assembly 18 and a hopper 19 which are also mounted on the frame 3. In the embodiment shown, the hopper 19 is connected to the frame 3 by left and right lift arms 21 and 22 which are pivotal by left and right hydraulic actuators 23 and 24 to move the hopper 19 between a retracted position in engagement with the debris loading assembly 18 and an extended position, separated from the debris loading assembly 18 and raised relative to the frame 3 for dumping of the contents of the hopper 19 into a truck or container (not shown).

The debris loading assembly 18 includes a debris loading duct 27 connected to the frame and having a rotary pick-up head or rotary broom 28 and a paddle rotor 29 rotatably mounted therein. An intake opening 31 is formed at an intake end 32 of the debris loading duct 27 with the intake end 32 supported in closely spaced relation above the ground 2 over which the sweeper 1 is moved. A discharge opening 35 is formed at a discharge end 36 of the debris loading duct 27. When the hopper 19 is in the retracted or loading position, the debris loading duct 27 is flow connected to the hopper 19, such that the discharge end 36 of the debris loading duct 27 is aligned with and surrounds a hopper inlet opening 39 formed in the hopper 19 and the discharge opening 35 of debris loading duct 27 communicates with the hopper inlet opening 39.

The rotary broom 28 comprises a plurality of bristles or pick-up members 41 projecting radially outward from a broom axle 43 which is rotatably mounted within an intake section 45 of the debris loading duct 27 proximate the intake opening 31. The rotary broom 28 extends across the debris loading duct 27 such that upon rotation of the rotary broom 28 the tips of the bristles 41 are positioned to contact and lift debris on the ground into the debris loading duct 27. The bristles or pick-up members 41 of the rotary broom or rotary pick-up head 28 could take a variety of forms including conventional fiber strands or filaments or rubber fingers of a variety of shapes including cylindrical or flattened.

The paddle rotor 29 includes a plurality of paddles 47 projecting radially outward from a paddle axle 48 which is rotatably mounted within and across a transfer section 49 of the debris loading duct 27. As used herein, it is to be understood that the paddle axle 48 may be integrally formed with the paddles 47 and the broom axle 43 may be integrally formed with the pick-up members with the axle 48 or 43 comprising the axis about which the rotor 29 or broom 28 rotates respectively. A path of rotation of tips of the paddles 47 extend in closely spaced relation to a path of rotation of tips of the bristles 41 of the rotary broom 28. The paddle rotor 29 rotates in the same direction as the rotary broom 28 such that the paddles 47 engage and transfer debris lifted by the rotary broom 28 into the transfer section 49 of the debris loading duct 27. The rotating paddles 47 engage and mechanically lift or fling the debris through the debris loading duct 27 and into the hopper 19. The paddle rotor 29 is preferably rotated at a speed sufficient to push air through the debris loading duct 27, such that rotation of the paddle rotor 29 transfers debris, kinetically and pneumatically, through the discharge opening 35 in the discharge end 36 of the debris loading duct 27, through the hopper inlet opening 39 and into the hopper 19.

Debris that is transferred into the hopper 19 settles to the bottom of the hopper 19 in a debris containment space 51. Left and right return air outlets 53 and 54 are formed in the hopper 19 and are separated from the hopper inlet opening 39 and the debris containment space 51 therein by a debris grate, screen or filter 55. The debris loading assembly 18 includes left and right return air ducts 57 and 58 extending along the left and right sides of the transfer section 49 of the debris loading duct 27. Left and right return air openings 61 and 62 are formed through the transfer section 49 of the debris loading duct 27 with the left and right return air openings 61 and 62 aligned with left and right axial ends 63 and 64 of the paddle rotor 29. When the hopper 19 is in the retracted position, the left and right return air ducts 57 and 58 are flow connected to the left and right return air outlets 53 and 54 in the hopper 19. Air blown into the hopper 19 by rotation of the paddles 47 exits the hopper 19 through the left and right return air outlets 53 and 54 and is directed through the left and right return air ducts 57 and 58 to the transfer section 49 of the debris loading duct 27 through the left and right return air openings 61 and 62.

Figure 6:
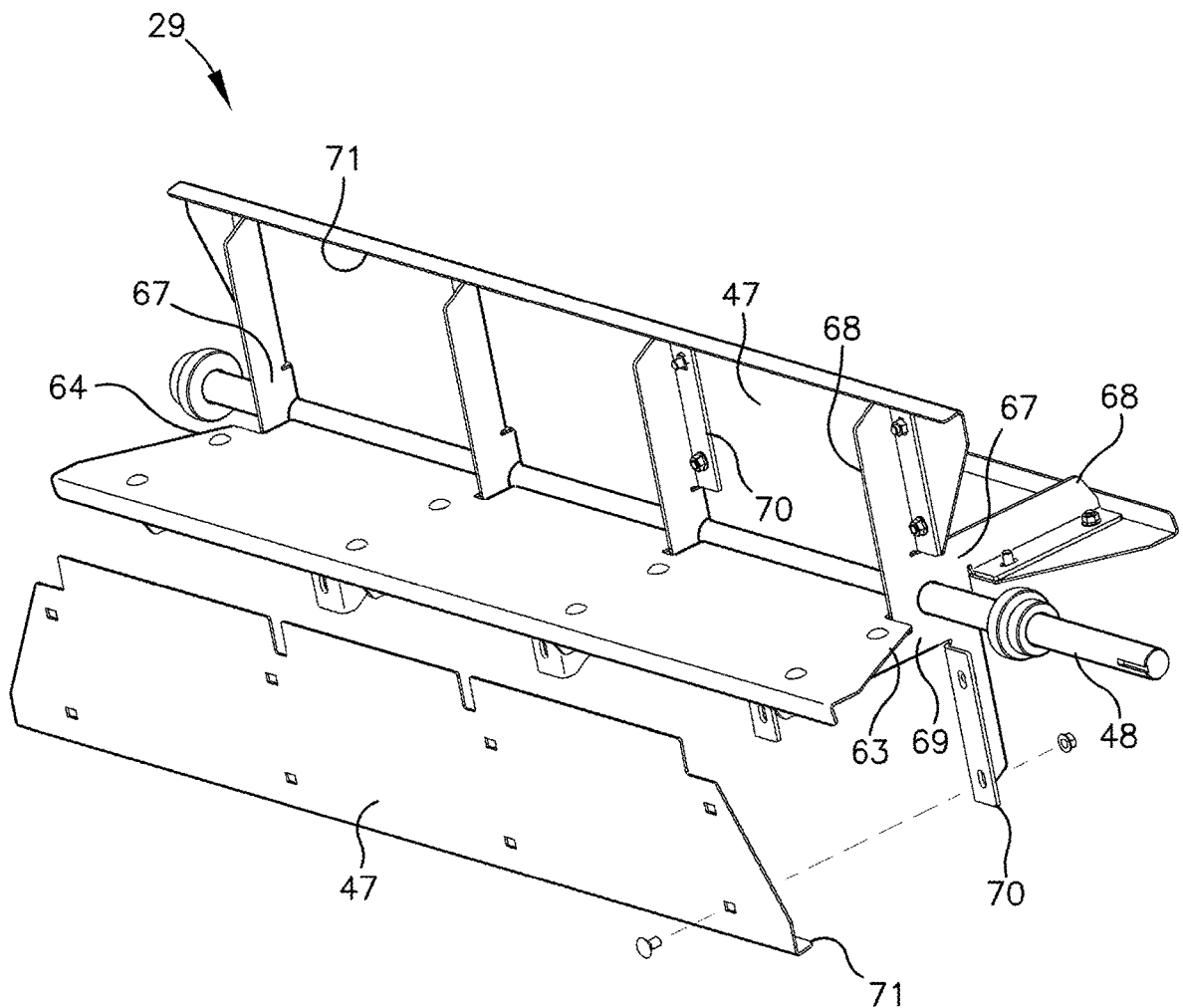
FIG. 6 is an enlarged, exploded, perspective view of the paddle rotor.

The left and right axial ends 63 and 64 of each paddle 47 preferably slope away from the adjacent left and right return air opening 61 and 62 respectively and toward the paddle axle 48 to facilitate the movement or drawing of air into the transfer section 49 of the debris loading duct 27 and into the path of rotation of the paddles 47 forcing the air to move, and recirculate with any debris entrained therein, up through the debris loading duct 27 and back into the hopper 19. In the embodiment shown in FIG. 6, the paddle rotor 29 comprises four paddles 47 supported on four paddle supports 67 which are mounted on and project radially outward from the paddle axle 48 in longitudinally spaced relationship. Each paddle support 67 is generally formed as a four-armed star with four support arms 68 projecting radially outward from a hub 69 which is connected to and surrounds the paddle axle 48. A paddle mounting flange 70 is formed on and extends transverse to each support arm 68. Each paddle 47 is formed from a piece of sheet metal that is bolted to the paddle mounting flanges 70 of four longitudinally and radially aligned support arms 68. A lip 71 is formed along an outer edge of each paddle 47 and overhangs ends of the support arms 68 and mounting flanges 70 to which the paddle 47 is bolted.

The debris loading assembly 18 is formed from left and right outer sidewalls 73 and 74, and front and rear panels 75 and 76 which enclose and form part of the debris loading duct 27 and enclose the broom 28 and paddle rotor 29. More specifically, lower sections of the left and right outer sidewalls 73 and 74 and of the front and rear panels 75 and 76 form the intake section 45 of the debris loading duct 27 which, in the embodiment shown, is wider than the transfer section 49 of the debris loading duct 27 because the rotary broom 28 is wider than the paddle rotor 29. Flexible guards or curtain wall segments 78 are connected to the lower ends of the left and right outer sidewalls 73 and 74 and front and rear panels 75 and 76 and extend downward therefrom a distance approximately equal to or further than the tips of the bristles 41 of the rotary broom 28. The curtain wall segments 78 help keep dust generated by the rotating bristles 41 of the rotary broom 28 from escaping out from the debris loading duct 27.

Above the rotary broom 28, the debris loading duct 27 narrows along the transfer section and is defined by left and right duct sidewalls 81 and 82 which are spaced inward from the left and right outer sidewalls 73 and 74. Left and right sloped transition segments 83 and 84 slope inward and upward from the left and right outer sidewalls 73 and 74 just above the outer ends of the rotary broom 28 to the left and right duct sidewalls 81 and 82 to funnel any debris picked up by the ends of the rotary broom 28 inward toward the narrower path of rotation of the paddles 47. The left and right duct sidewalls 81 and 82 and the left and right outer sidewalls 73 and 74 above the rotary broom 28 in combination with the overlapping portions of the front and rear panels 75 and 76 above the rotary broom 28 form the left and right return air ducts 57 and 58.

Figure 5:
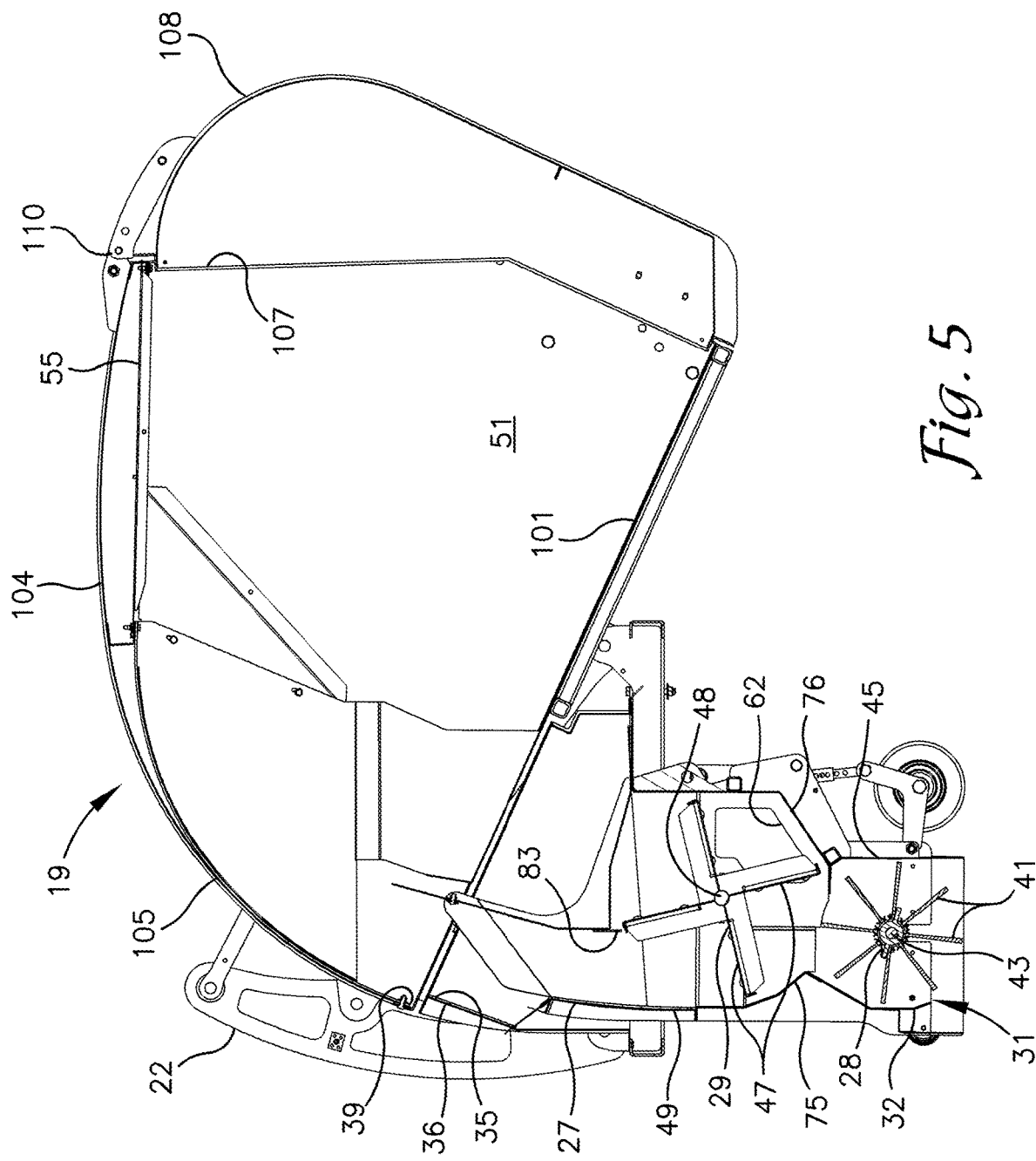
FIG. 5 is an enlarged, cross-sectional view of the hopper and debris loading assembly taken generally along line 5-5 of FIG. 2.

In the embodiment shown, and when viewed from the left side of the sweeper 1 as in FIG. 5, the rotary broom 28 rotates clockwise so that along the lower portion of the path of rotation of the broom bristles 41, the bristles 41 rotate forward to engage debris on the ground 2 and then upward and then rearward to move the debris toward the transition section 49. The paddle rotor 29 rotates in the same direction (clockwise when viewed from the left) so that along the lower portion of the path of rotation of the paddles 47, the paddles 47 rotate forward engaging the debris lifted upward by the broom bristles 41 and the paddles 47 then lift the debris upward through the debris loading duct 27 and out the discharge opening 35 and through the hopper inlet opening 39 and into the hopper 19.

As best seen in FIG. 5, the front panel 75 is shaped to extend in relatively closely spaced relation to the upper, front portion or quadrant of the path of rotation of the bristles 41 of the rotary broom 28 to within approximately 15 degrees from the top of the path of rotation of the broom bristles 41. The lower, front portion of the front panel 75 is similarly shaped to extend in relatively closely spaced relation to the path of rotation of the paddles 47 of the paddle rotor 29. The rearward sloping of the front panel 75 along the upper front, quadrant of the path of rotation of be broom bristles 41 minimizes any dead space in which the debris lifted by the broom bristles 41 might accumulate to ensure the debris is efficiently lifted by the broom bristles 41 into the path of rotation of the paddles 47.

An adjustable bracket 83 is mounted at a bend in the rear panel 76 and extends downward over the path of rotation of the paddle rotor 29. The vertical position of a lower end of the adjustable bracket 83 is adjustable to minimize the gap between the tips of the paddles 47 and the bend in the rear panel 76 as it curves rearward to extend around a rear portion of the paddle rotor 29. The adjustable bracket 83 functions to direct debris and air pushed by the paddles 47 upward through an upper section of the debris loading duct 27 and through the discharge opening 35 instead of recirculating within the portion of the debris loading duct 27 surrounding the paddle rotor 29.

The rotary broom 28 and the paddle rotor 29 are chain driven by a hydraulic motor 85 mounted on a motor mount 86 connected to the debris loading duct 27 on or near the left outer sidewall 73. The hydraulic motor extends inward from the left outer sidewall 73 in front of the front panel 75. The hydraulic motor 85 is driven by a hydraulic pump (not shown) powered by the engine 16. A drive motor shaft 88 extends through the left outer sidewall 73 and a main drive sprocket 89 is connected to a distal end of the shaft 88. A paddle drive chain 90 is connected between the main drive sprocket 89 and a paddle drive sprocket 91 on a portion of the paddle axle 48 extending through the left outer sidewall 73. A broom drive chain 92 is connected between a transfer sprocket 93 on the paddle axle 48 and a broom drive sprocket 94 on the end of the broom axle 43 extending through the left outer sidewall 73. The sprockets 89, 91 and 93 are sized such that the paddle rotor 29 rotates faster than the rotary broom 28 to ensure that the paddles 47 move the debris away from the transfer section 49 faster than it is delivered thereto by the broom 28. An engine 16 rated at 25 horsepower or possibly less, should be sufficient to supply enough power to drive the paddle rotor 29 and rotary broom 28 at the desired speeds for moving debris through the debris loading duct 27 and into the hopper 19

The hopper 19 includes a downwardly and rearwardly sloping floor 101, left and right outer sidewalls 102 and 103, a top panel or roof 104 which slopes forward and downward to a front panel or section 105. A dump opening 107 is formed between the ends of the left and right outer sidewalls 102 and 103, the roof 104 and the floor 101. A hopper door or dump door 108 is pivotally connected to the rear end of the roof 104 by hinges 110 to cover the door opening 107.

Figure 7:
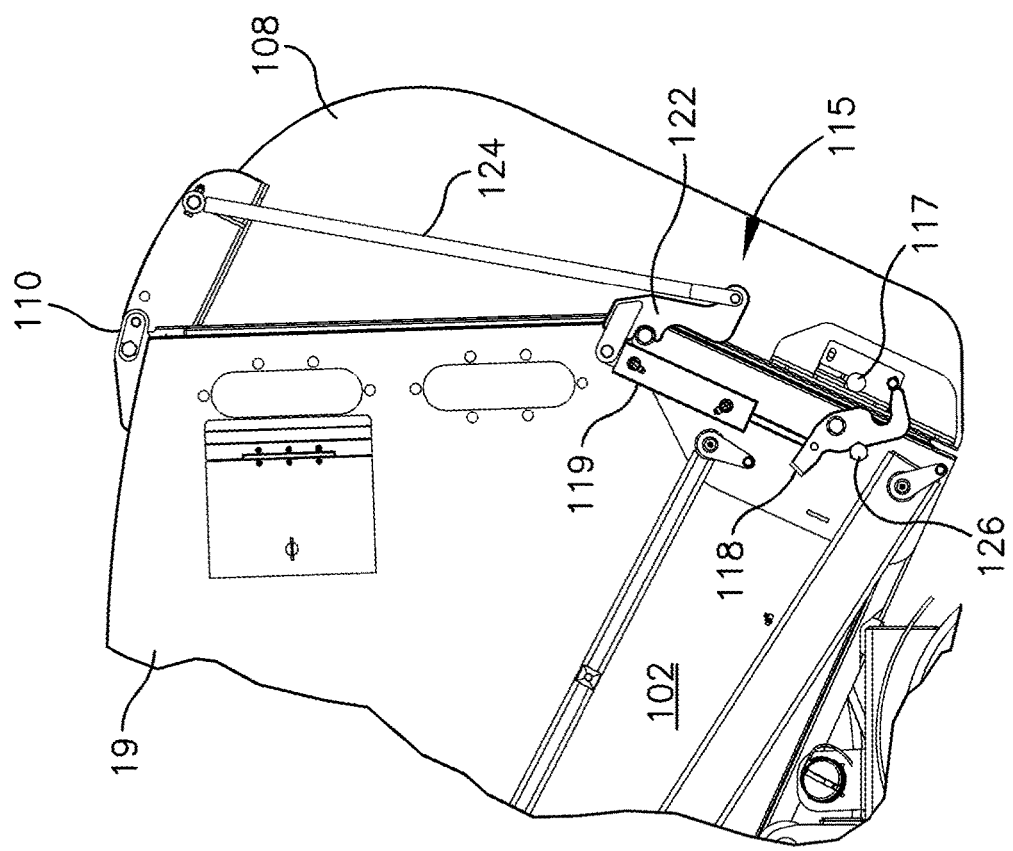
FIG. 7 is a fragmentary, left side elevational view of the hopper with shielding removed to show a hopper door latching and lifting assembly holding a dump door of the hopper closed relative to a dump opening in the hopper by a dump door actuator.
Figure 8:
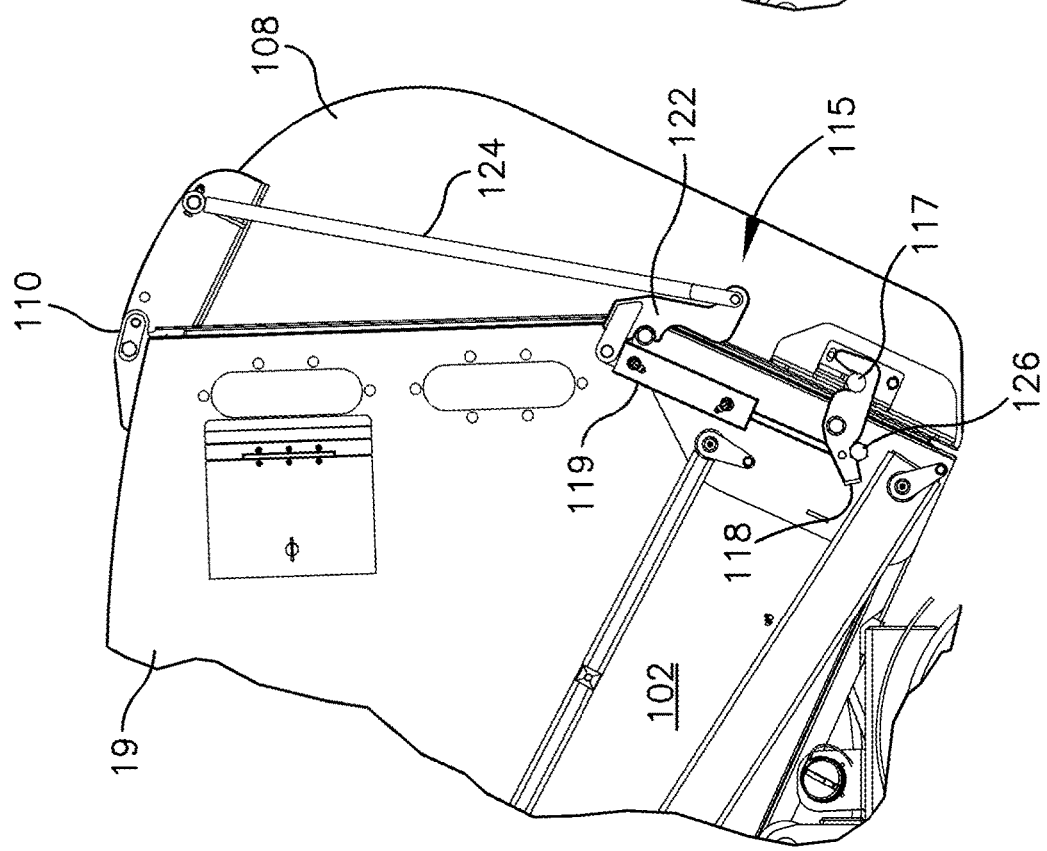
FIG. 8 is a view similar to FIG. 7 showing the dump door actuator partially retracted to move the latch to an unlatched position relative to a latch pin on the dump door and with the dump door still closed relative to the dump opening.
Figure 9:
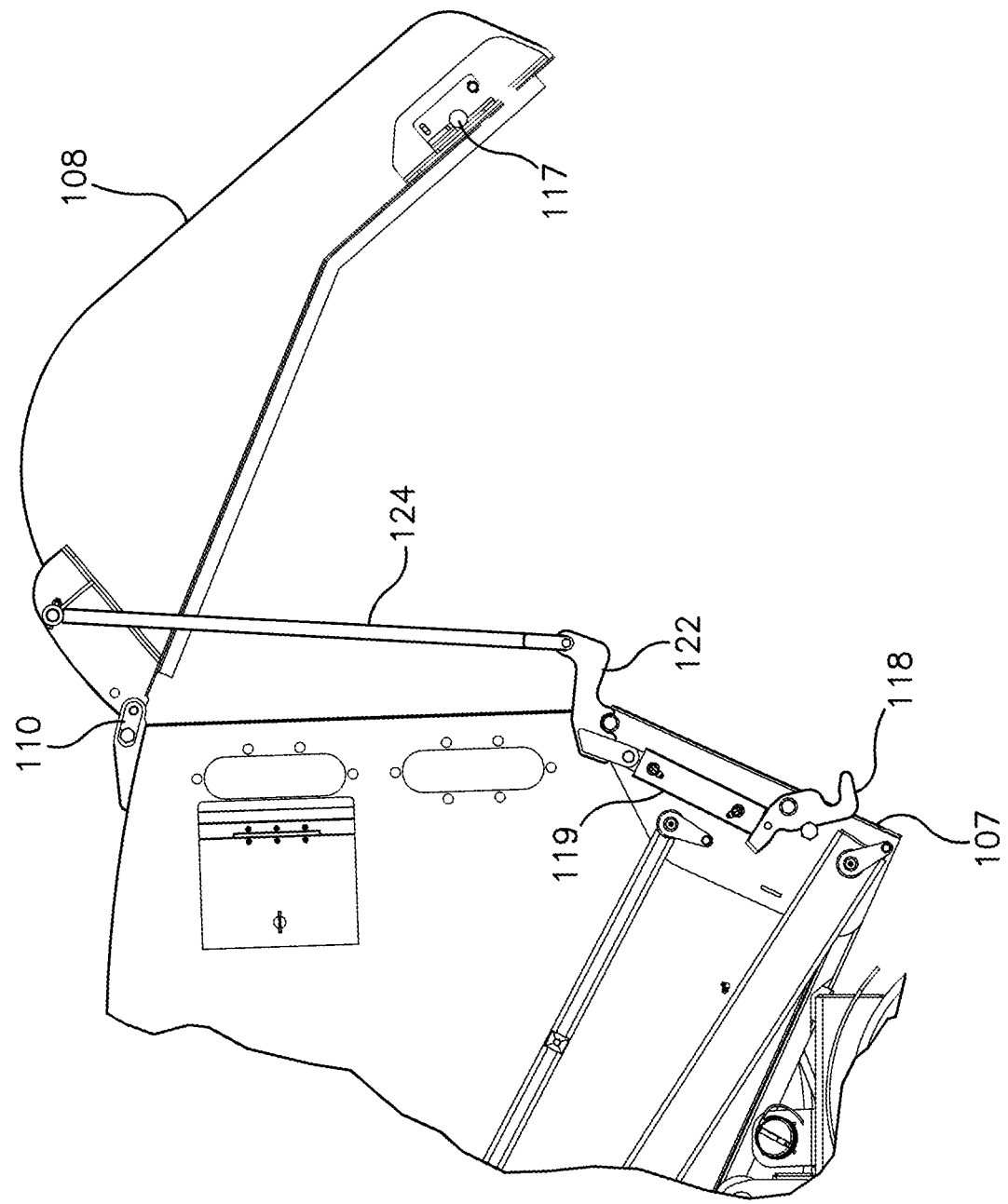
FIG. 9 is a view similar to FIGS. 7 and 8 showing the dump door actuator fully retracted and the dump door lifted to an open position relative to the dump opening by a door lift linkage and a door lift arm.
Figure 10:
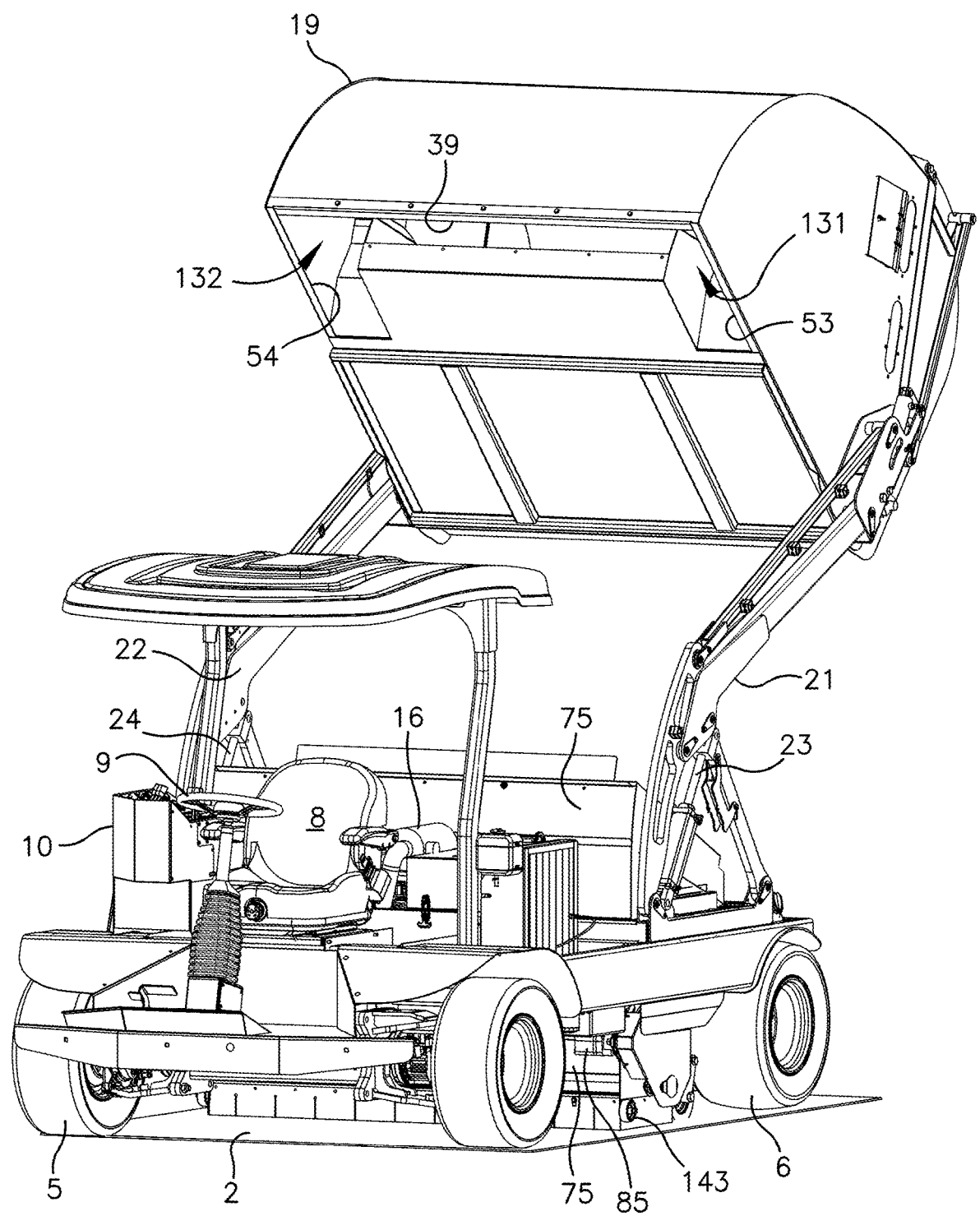
FIG. 10 is a perspective view of the sweeper showing the hopper raised relative to the debris loading assembly by lift arms connecting the hopper to the frame.
Figure 11:
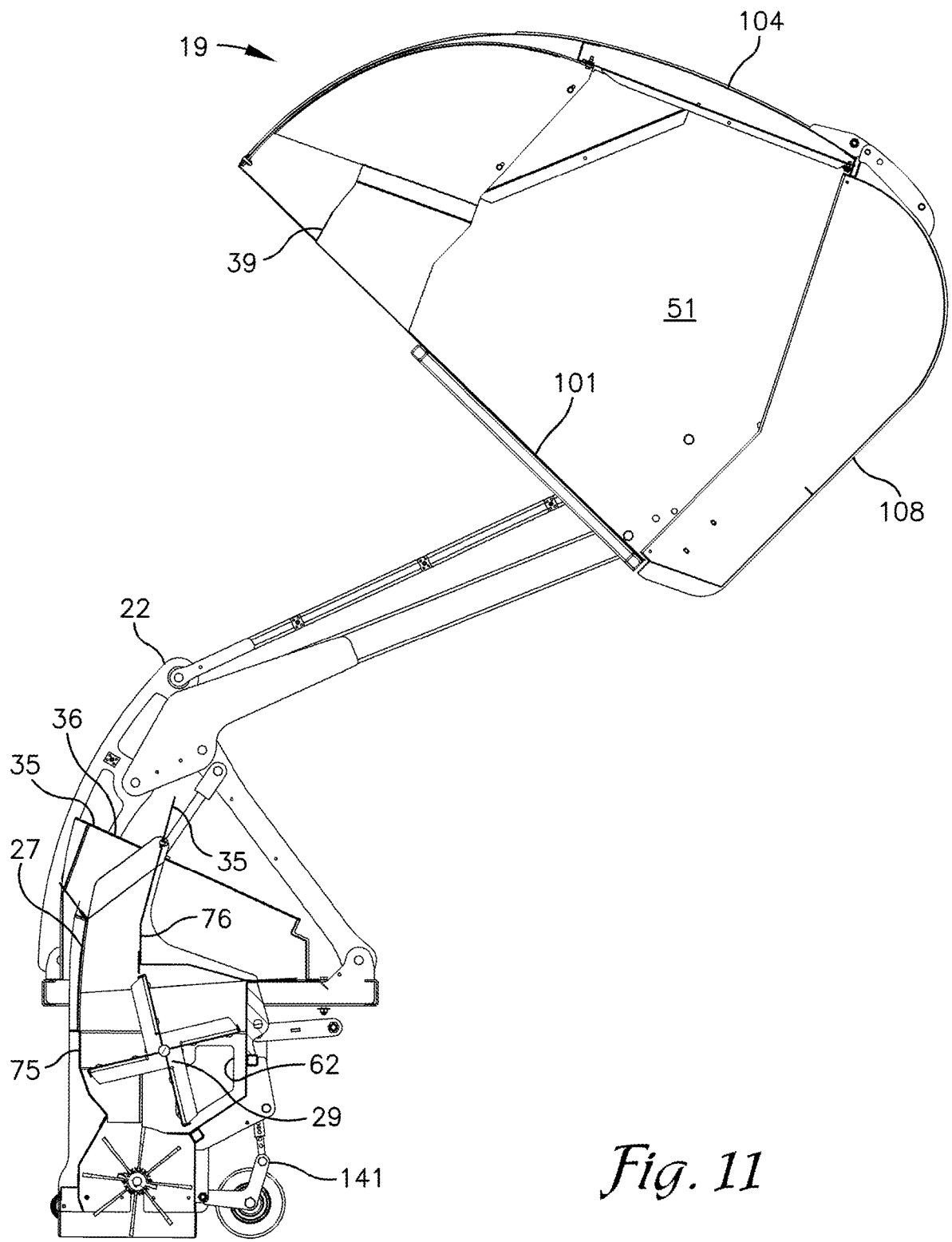
FIG. 11 is a cross-sectional view similar to FIG. 5 showing the hopper separated from the debris loading assembly.

As best seen in FIGS. 7-9, a hopper door latching and lifting assembly 115 is mounted on each side of the hopper proximate the door opening 107 (only the assembly 115 on the left side is shown). For each hopper door latching and lifting assembly 115, a latch pin 117 projects outward from the lower end of the dump door 108 on each side thereof. A latch 118 is pivotally mounted on each of the hopper sidewalls 102 and 103 near the lower end and proximate the dump opening 107. Each latch 118 is pivoted by a hydraulic actuator 119 to engage and disengage the respective latch pin 117. A first end of the actuator 119 is pivotally connected to the associated latch 118 and a second end is pivotally connected to a door lift linkage 122 which is pivotally mounted on a respective sidewall 102 or 103 of the hopper 19. A door lift arm 124 is pivotally connected at a first end to the door lift linkage 122 and at an opposite end to the dump door 108 proximate the hinge 110.

With reference to latching and lifting assembly 115 shown on the left side of the hopper 19 and with the dump door 108 closed, the actuator 119 is extended and the latch 118 engages the latch pin 117 to hold the door 108 closed. As the actuator 119 is initially retracted, the first end of the actuator 119 pivots the latch 118 away from the latch pin 117 to allow the door 108 to move relative to the hopper 19. After the latch 118 is pivoted out of engagement with the latch pin 117, the latch 118 engages a stop pin 126 preventing further pivoting of the latch 118 which causes the second end of the actuator 119 to move toward the first end causing the door lift linkage 122 to pivot moving the door lift arm 124 upward to pivot the dump door 108 away from the hopper 19, as shown in FIG. 9, to allow the contents to slide out the door opening 107.

The dump door 108 is closed by extending the actuator 119. Extension of the actuator 119 first pivots the door lift linkage 122 to draw the lift arm 124 and door downward. Further extension of the actuator 119 pivots the latch 118 to extend around the latch pin 117 drawing the door 108 to a fully closed position and securing the door closed.

It is also foreseen that instead of using the latches 118 to hold the door closed, each actuator 119 could be mounted on a respective hopper sidewall 102 or 103 and a pilot operated check valve (not shown) could be connected to the base end of each actuator 119 to selectively hold the actuator in the extended position, holding the door closed tight.

Figure 2:
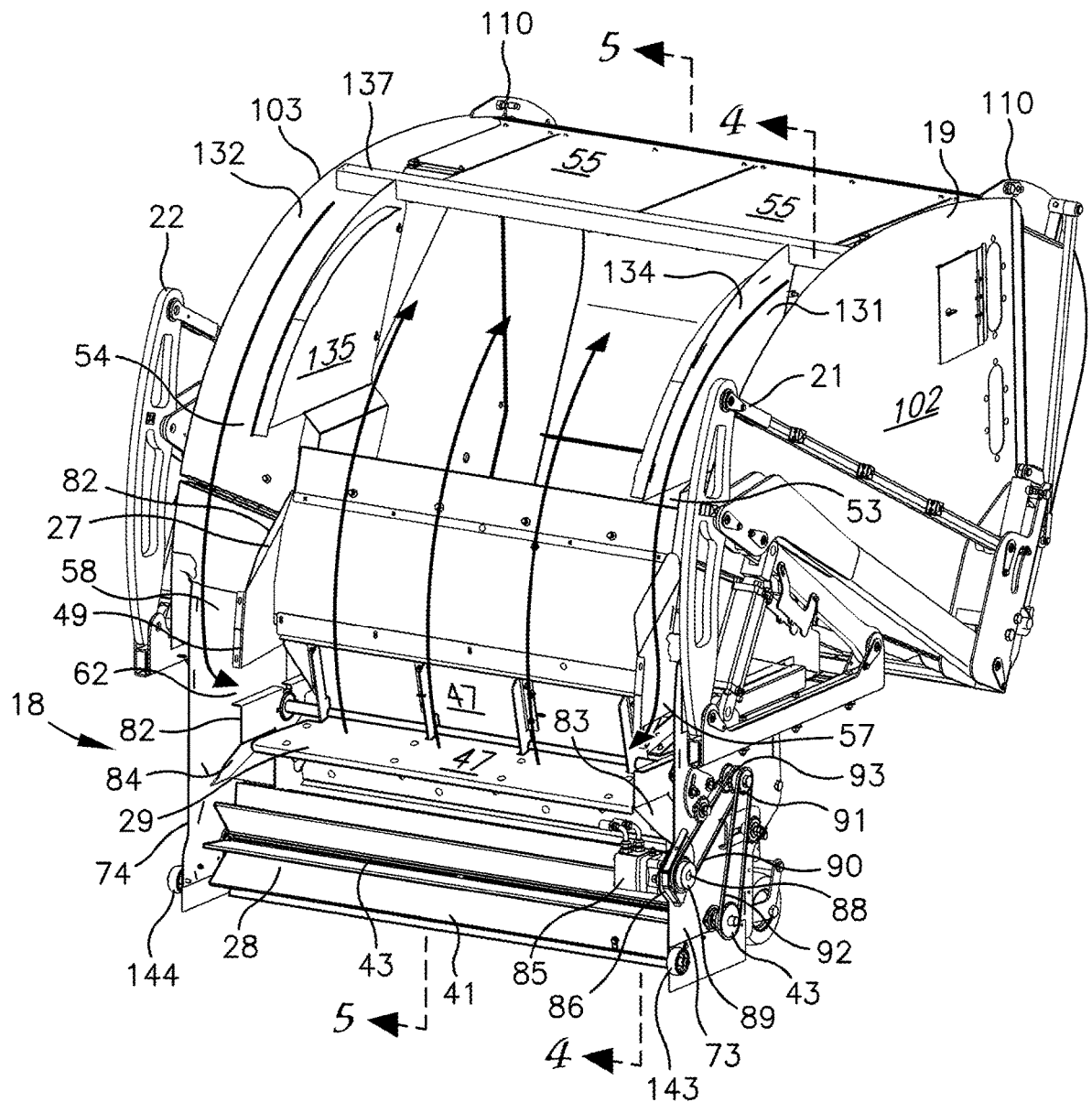
FIG. 2 is a front, left side perspective view of the hopper and debris loading assembly as shown in FIG. 1 with portions removed to show interior details and arrows added to show the direction of flow of debris as it is transferred by a rotary broom and paddle rotor within the debris loading assembly into the hopper and return air that is directed out of the hopper and back to the paddle rotor through a return air duct.
Figure 3:
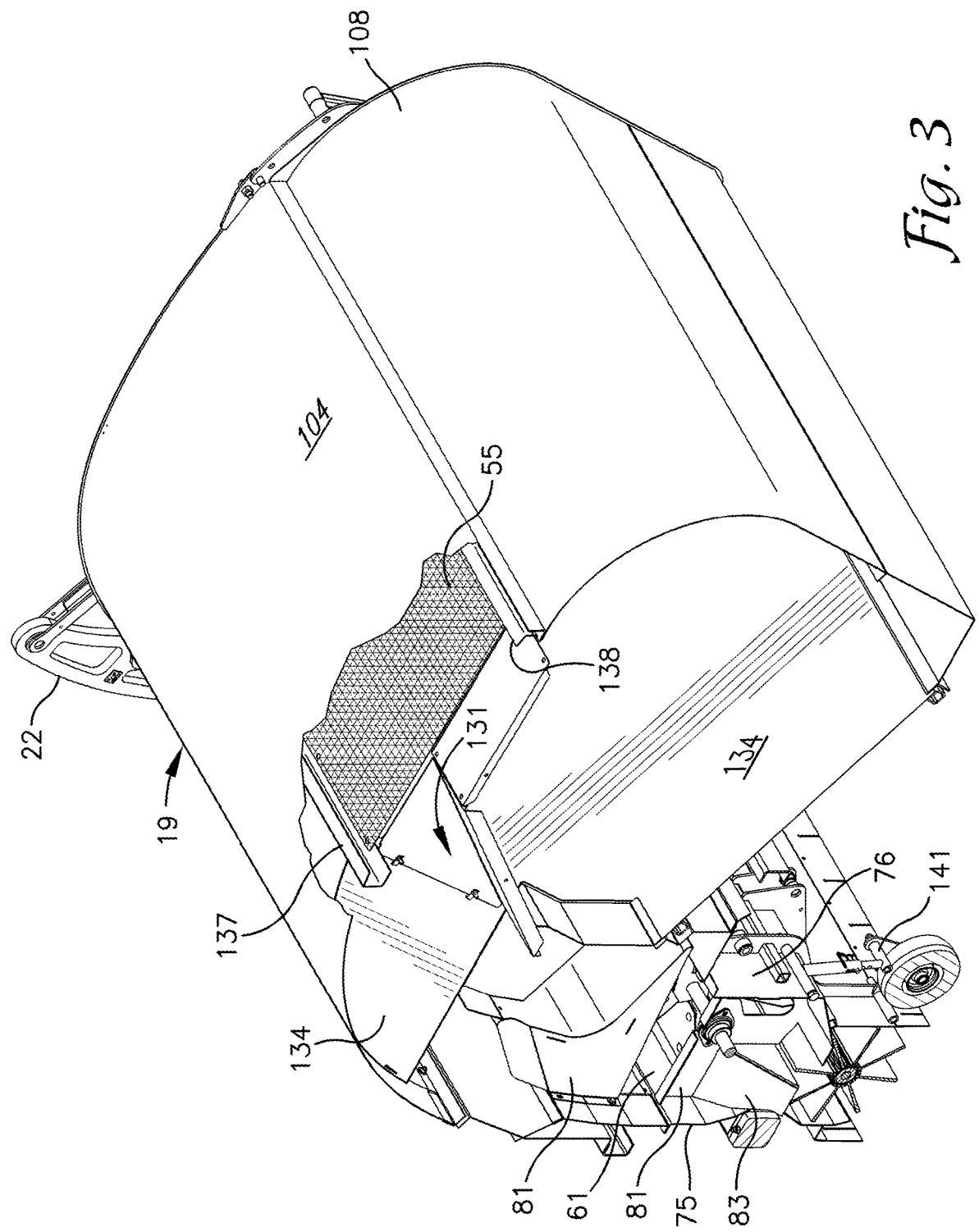
FIG. 3 is a rear, left side perspective view of the hopper and debris loading assembly with portions removed to show the return air duct in more detail.
Figure 4:
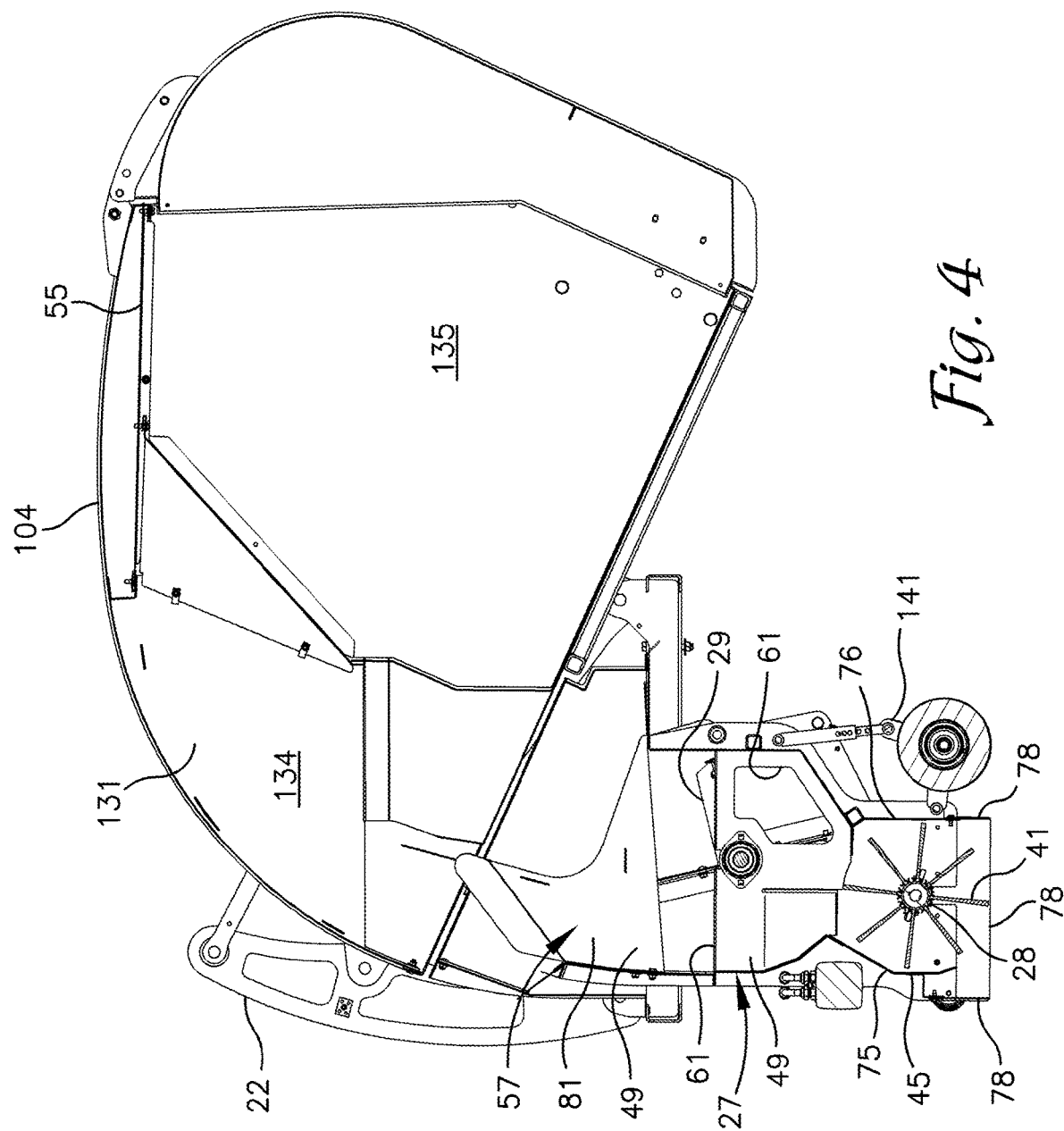
FIG. 4 is an enlarged, cross-sectional view of the hopper and debris loading assembly taken generally along line 4-4 of FIG. 2 and corresponding to the perspective view of FIG. 3.

As best shown in FIGS. 2 and 3, left and right hopper discharge ducts 131 and 132 are formed by left and right inner sidewalls 134 and 135 with the left and right outer sidewalls 102 and 103 of the hopper 19. Two grates, screens or filters 55 are supported on front and rear filter supports 137 and 138 which extend between the left and right inner sidewalls 134 and 135 of the hopper 19 in spaced relation below the hopper roof 104. The space between the filters 55 and the roof may be referred to as the head space which opens into the left and right hopper discharge ducts 131 and 132. The left and right hopper discharge ducts 131 and 132 extend to the left and right return air outlets 53 and 54 of the hopper 19. Air blown into the hopper 19 passes through the filters 55, through the head space and into the left and right hopper discharge ducts 131 and 132 past the left and right return air outlets 53 and 54 and then into the left and right return air ducts 57 and 58 in the debris loading assembly 18. The return air is then drawn into the transfer section 49 of the debris loading duct 27 through the left and right return air openings 61 and 62 in the left and right duct sidewalls 81 and 82 by the suction created by the rotating paddles 47.

The debris loading assembly 18 is adjustably mounted to the frame 3 to allow adjustments to the spacing of the intake opening 31 relative to the ground over which the sweeper 1 moves. Intake spacing assemblies (only the left one shown) 141 are connected between the frame 3 and the intake end 32 of the debris loading duct 27 of the debris loading assembly 18 to allow adjustment to the selected height of the intake opening 31 relative to the ground 2 over which the sweeper 1 is moved. Left and right anti-gouge wheels 143 and 144 are mounted on front corners of the lower end of the debris loading duct 27 to maintain a minimum spacing between the ground and the bottom edge of the debris loading duct 27 to prevent the debris loading duct from gouging the ground as the sweeper 1 moves over uneven ground.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed is:

1. A sweeper moveable over the ground to collect debris on the ground comprising:
    a hopper having a hopper inlet opening;
    a debris loading duct having an intake opening at an intake end and a discharge opening at a discharge end of the debris loading duct, the discharge opening communicating with the hopper inlet opening
    a rotary pick-up head rotatably mounted within an intake section of the debris loading duct proximate the intake opening and having a plurality of radially outward projecting pick up members, the rotary pick-up head extending across the debris loading duct such that upon rotation of the rotary pick-up head the pick-up members are positioned to contact and lift debris from the ground into the debris loading duct;
    a paddle rotor rotatably mounted within and across a transfer section of the debris loading duct and having a plurality of radially outward projecting paddles with a path of rotation of tips of the paddles extending in closely spaced relation to a path of rotation of tips of the pick-up members of the pick-up head and the paddle rotor rotating in the same direction as the rotary pick-up head such that the paddles engage and transfer debris lifted by the rotary pick-up head into the transfer section of the debris loading duct; rotation of the paddle rotor transfers debris through the discharge opening in the debris loading duct, through the hopper inlet opening and into the hopper; and
    a return air duct flow connecting a return air outlet to the hopper with a return air opening through the transfer section of the debris loading duct.

2. The sweeper as in claim 1 wherein the return air opening is aligned with an axial end of the paddle rotor.

3. The sweeper as in claim 2 wherein an end of each paddle facing the return air opening through the transfer section slopes away from the return air opening toward an axle of the paddle.

4. The sweeper as in claim 1 wherein
    the hopper includes a return air outlet separated from the hopper inlet opening and a debris containment space in the hopper by a debris filter.

5. The sweeper as in claim 4 wherein the return air opening is aligned with an axial end of the paddle rotor.

6. A sweeper moveable over the ground to collect debris on the ground comprising:
    a hopper having a hopper inlet opening;
    a debris loading duct having an intake opening at an intake end and a discharge opening at a discharge end of the debris loading duct, the discharge opening communicating with the hopper inlet opening
    a rotary pick-up head rotatably mounted within an intake section of the debris loading duct proximate the intake opening and having a plurality of radially outward projecting pick up members, the rotary pick-up head extending across the debris loading duct such that upon rotation of the rotary pick-up head the pick-up members are positioned to contact and lift debris from the ground into the debris loading duct; and
    a paddle rotor rotatably mounted within and across a transfer section of the debris loading duct and having a plurality of radially outward projecting paddles with a path of rotation of tips of the paddles extending in closely spaced relation to a path of rotation of tips of the pick-up members of the pick-up head and the paddle rotor rotating in the same direction as the rotary pick-up head such that the paddles engage and transfer debris lifted by the rotary pick-up head into the transfer section of the debris loading duct; rotation of the paddle rotor transfers debris through the discharge opening in the debris loading duct, through the hopper inlet opening and into the hopper; wherein
    the hopper includes left and right return air outlets separated from the hopper inlet opening and a debris containment space in said hopper by at least one debris filter;
    the sweeper further comprising left and right return air ducts flow connecting the left and right return air outlets from the hopper with the left and right return air openings through the transfer section of the debris loading duct respectively.

7. The sweeper as in claim 6 wherein the left and right return air openings are aligned with left and right axial ends of the paddle rotor.

8. The sweeper as in claim 7 wherein left and right ends of each paddle slope away from the adjacent return air opening toward an axle of the paddle.

9. A sweeper moveable over the ground to collect debris on the surface of the ground comprising:
   a hopper having a hopper inlet opening and connected to a frame by at least one lift arm assembly operable to move the hopper between raised and retracted positions relative to the frame;
   a debris loading duct connected to the frame and having an intake opening at an intake end supported in closely spaced relation above the ground over which the sweeper is moved and a discharge opening at a discharge end of the debris loading duct, the debris loading duct flow connected to the hopper, in the retracted position, such that the discharge end of the debris loading duct is aligned with the hopper inlet opening and the discharge opening communicates with the hopper inlet opening
   a rotary pick-up head, having a plurality of pick-up members projecting radially outward from a broom axle and rotatably mounted within an intake section of the debris loading duct proximate the intake opening, the rotary pick-up head extending across the debris loading duct such that upon rotation of the rotary pick-up head the pick-up members are positioned to contact and lift debris into the debris loading duct;
   a paddle rotor, having a plurality of paddles projecting radially outward from a paddle axle and rotatably mounted within and across a transfer section of the debris loading duct with a path of rotation of tips of the paddles extending in closely spaced relation to a path of rotation of tips of the pick-up members of the pick-up head and the paddle rotor rotating in the same direction as the rotary pick-up head such that the paddles engage and transfer debris lifted by the rotary pick-up head into the transfer section of the debris loading duct; rotation of the paddle rotor transfers debris through the discharge opening in the debris loading duct, through the hopper inlet opening and into the hopper; and
   a return air duct flow connecting a return air outlet from the hopper with a return air opening through the transfer section of the debris loading duct.

10. The sweeper as in claim 9 wherein the return air opening is aligned with an axial end of the paddle rotor.

11. The sweeper as in claim 10 wherein an end of each paddle facing the return air opening through the transfer section slopes away from the return air opening toward the paddle axle.

12. The sweeper as in claim 9 wherein return air outlet is separated from the hopper inlet opening and a debris containment space in the hopper by a debris filter.

13. The sweeper as in claim 9 wherein the return air outlet comprises left and right return air outlets separated from the hopper inlet opening and a debris containment space in said hopper by at least one debris filter; and the return air duct comprising left and right return air ducts flow connecting the left and right return air outlets from the hopper with left and right return air openings through the transfer section of the debris loading duct respectively.

14. The sweeper as in claim 13 wherein the left and right return air openings are aligned with left and right axial ends of the paddle rotor.

15. The sweeper as in claim 14 wherein left and right ends of each paddle slope away from the adjacent return air opening toward the paddle axle.

16. A sweeper moveable over the ground to collect debris on the ground comprising:
   a hopper having a hopper inlet opening;
   a debris loading duct having an intake opening at an intake end and a discharge opening at a discharge end of the debris loading duct, the discharge opening communicating with the hopper inlet opening
   a rotary pick-up head rotatably mounted within an intake section of the debris loading duct proximate the intake opening and having a plurality of radially outward projecting pick up members, the rotary pick-up head extending across the debris loading duct such that upon rotation of the rotary pick-up head the pick-up members are positioned to contact and lift debris from the ground into the debris loading duct; and
   a return air duct separated from the debris loading duct by a duct sidewall and flow connecting a return air outlet to the hopper with a return air opening through the duct sidewall and into the debris loading duct.

17. The sweeper as in claim 16 wherein the duct sidewall extends between a front panel and a rear panel forming the debris loading duct.

18. The sweeper as in claim 17 wherein the return air opening extends through the duct sidewall and into the debris loading duct above an outer end of the rotary pick-up head.

19. A sweeper moveable over the ground to collect debris on the ground comprising:
   a hopper having a hopper inlet opening;
   a debris loading duct having an intake opening at an intake end and a discharge opening at a discharge end of the debris loading duct, the discharge opening communicating with the hopper inlet opening;
   a rotary pick-up head rotatably mounted within an intake section of the debris loading duct proximate the intake opening and having a plurality of radially outward projecting pick up members, the rotary pick-up head extending across the debris loading duct such that upon rotation of the rotary pick-up head the pick-up members are positioned to contact and lift debris from the ground into the debris loading duct;
   a left return air duct separated from the debris loading duct by a left duct sidewall and flow connecting a left return air outlet to the hopper with a left return air opening through the left duct sidewall and into the debris loading duct; and
   a right return air duct separated from the debris loading duct by a right duct sidewall and flow connecting a right return air outlet to the hopper with a right return air opening through the right duct sidewall and into the debris loading duct.

20. The sweeper as in claim 19 wherein the left duct sidewall and the right duct sidewall extend between a front panel and a rear panel forming the debris loading duct.

21. The sweeper as in claim 20 wherein the left return air opening extends through the left duct sidewall and into the debris loading duct above a left outer end of the rotary pick-up head and the right return air opening extends through the right duct sidewall and into the debris loading duct above a right outer end of the rotary pick-up head.

* * * * *